Patented Sept. 21, 1926.

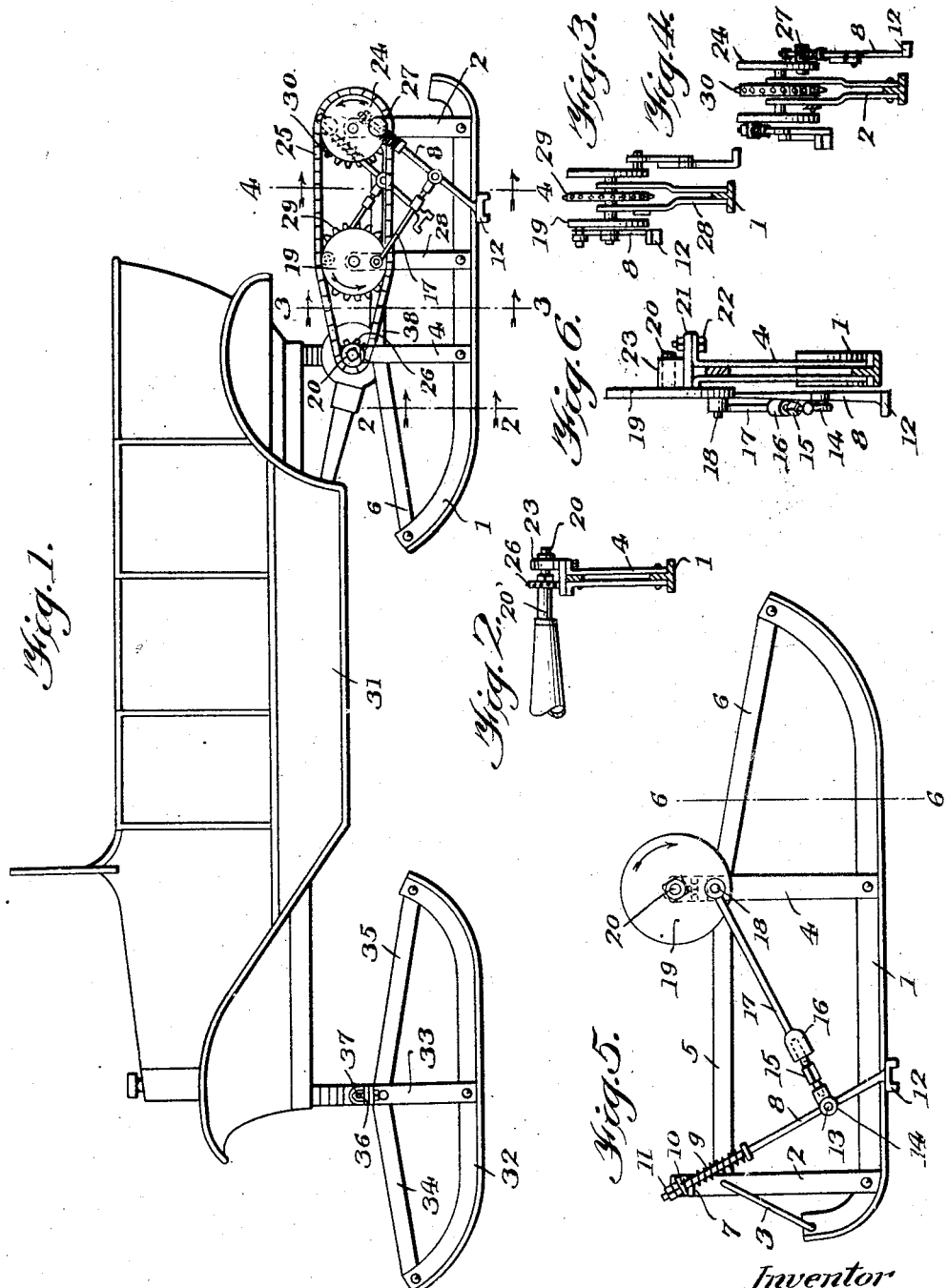

1,600,285

UNITED STATES PATENT OFFICE.

AMOS F. LADWIG, OF WATERLOO, IOWA.

SLEIGH ATTACHMENT FOR VEHICLES.

Application filed March 13, 1925. Serial No. 15,306.

My invention relates to improvements in sleigh attachments for vehicles, and the object of my improvement is to supply for use at times on wheeled vehicles of any type, but more particularly upon self-propelled vehicles, removable sleigh runners mounted thereon in lieu of the wheels thereof, with inexpensive, uncomplicated mechanism for propelling the vehicle adapted for connection to and actuation by the motor or other propelling power of the vehicle.

This object I have accomplished by the means which are hereinafter described and claimed, and which are illustrated in the accompanying drawings, it being understood that the invention resides in the combination and arrangement of parts and in the details of construction hereinafter described, and that changes in the precise embodiment of invention herein disclosed can be made within the scope of what is claimed without departing from the spirit of the invention.

In the drawings similar numerals of reference denote corresponding parts throughout the several views.

In the drawings, Fig. 1 is a side elevation of a motor vehicle equipped with my improved sleigh attachments, after removal of the carrying-wheels thereof. Fig. 2 is a section of one of the rear runners with its propelling mechanism taken on the broken line 2—2 of Fig. 1. Fig. 3 is a section of the same device taken on the broken line 3—3 of Fig. 1, and Fig. 4 is a section of the same device taken on the broken line 4—4 of Fig. 1. Fig. 5 is a side elevation, on a larger scale, of one of my sleigh attachments as modified for use on a vehicle, particularly of a lighter type. Fig. 6 is a sectional view of the said device taken on the broken line 6—6 of said Fig. 5.

Referring first to said Figs. 1, 2, 3 and 4, the numeral 31 denotes the body of a passenger motor vehicle, from whose front axle 37 and rear axles 20 the usual carrying-wheels have been removed in order to substitute therefor my sleigh attachments.

Runners 32 of a simple construction are used at the front of said vehicle, each having a hollow bearing sleeve 36 rigidly mounted on a standard 33 braced at front and rear by the brace-bars 34 and 35.

A somewhat similar pair of runners 1 are mounted on the rear axles 20 pivotally also, each runner having three standards 4, 28 and 2, which are rigidly connected together and to the upwardly curved front part of the runner by means of brace-bars 6 and 38. As shown in Fig. 2, said standards are arranged in pairs, and a hollow bearing 23 is mounted adjustably upon the offset tops of the standards by means of a bolt, and the axle spindle terminal is pivotally mounted in said bearing removably. Upon the axle spindle 20 is fixed removably a sleeve 20' having thereon a sprocket-pinion 26.

Referring to said Fig. 4, the numeral 30 denotes a sprocket-wheel whose shaft is mounted in bearing openings in the upper ends of the pair of standards 2, and a sprocket-chain 25 is passed around the pinion 26 and said sprocket-wheel 30, also passing around and meshing with the teeth of an intermediate sprocket-idler 29, the latter having a shaft rotatably mounted in bearing openings in the upper ends of the intermediate pair of standards 28. On the outer opposite ends of the shafts of said sprockets 29 and 30 are mounted like disks 19 and 24 respectively, the disks on each side of the runner having crank-pins at the same relative positions thereon, and the disks on the other side having crank-pins also, but placed oppositely diametrically relative to the crank-pins on the first-mentioned disks.

The numeral 8 denotes a pair of propelling members of elongated shapes, having dentated widened cross feet 12 at their lower ends. These are similar to the single propelling member 8 shown in Fig. 5, but their upper ends are slidingly connected to and seated in diametrical holes in the relatively large crank-pins 27 which latter are pivotally mounted in said disks 24, to slide freely therethrough. The members 8 have threaded ends with terminal securing and adjusting nuts, and between an enlargement on each member 8 and said crank-pin 27 a coiled compression-spring is mounted on said member and engaged between the enlargement and the crank-pin.

A connecting-rod or pitman 17 is pivotally connected between the crank-pin on each disk 19 and the member 8 on the same side. This connecting-rod is adjustably constructed with the two elements 17 and 14 having their abutting ends provided with interiorly threaded sockets to receive the reversely threaded terminals of a turnbuckle 15 for lengthwise adjustments, as more clearly displayed in said Fig. 5. These member parts 17 and 14 are suitably widened as at 16 for this purpose, and the members 14 are pivoted to the members 8 on pintles 13.

In the modification shown in said Fig. 5, the device has but one propelling member 8, and may be mounted on the driving axle of a bicycle or tricycle or the like at 20, the disk 19 being removably fixed on the axle, with the member part 17 terminally pivoted on the disk crank-pin 18. The upper part of the member 8 is slidingly inserted in a rockable eye-bolt 10 which traverses a horizontally rocking member 7 mounted on the top of the rear standard 2, the latter having a brace link 3 to the rear heel of the runner 1. Nuts 11 are placed on the threaded terminal of the member 8 for securing same and for adjusting the tension of the coiled spring 9 which is engaged between an enlargement of the member 8 and the eye of the bolt 10.

In this device the rotation of the driving axle 20 causes the pitman 17—14 to oscillate the propelling member 8 swingingly so as to at intervals engage the surface of ice or snow beneath and at one side of the runner 1 and with a pushing movement thereagainst propelling the runner forwardly, or reversely as the case may be, the spring 9 yielding to permit of giving of the member 8 to thus disengage ground obstacles to prevent entanglement therewith or breakage of the mechanism.

The device shown in said Fig. 1, is operated in a like manner, but members 8 are located on opposite sides of each runner for greater propelling power and enlarged ground contacts, with more rapidly alternated driving impulses. The sprocket-gearing shown is reducing in speed effect with increase of propelling power, and may be reversed if desired.

Having described my invention, what I claim as new, and desire to secure by Letters Patent, is:

1. In combination, a sleigh runner, a rotatable driving shaft journaled thereon, a rotatable driven shaft also journaled thereon, sprocket-gearing on both shafts, a sprocket-chain connecting said gearings, an idler sprocket-wheel rotatably engaged with said chain and journaled on said runner, one of said first-mentioned sprocket-gears and also said idler having crank-portions, the crank on the former having a diametrical bearing opening and being pivotally connected to its gear, an arm mounted slidingly in said bearing opening and elastically adjustably connected to said crank, a sectional pitman having one section terminally pivoted to the crank on said idler, and another section terminally pivoted to said arm, and an adjustable connecting-means between said sections.

2. In combination, a sleigh runner, a shaft rotatably journaled on said sleigh runner and having a crank portion, said sleigh runner having to the rear of said shaft a pivoted apertured bearing member, a propeller arm having a pressure foot and having its upper part slidable through the aperture of said bearing member and threaded above the latter, an adjusting-nut on said threaded part above the bearing member, a coiled compression spring on said arm engaged therewith at its lower end and engaged at its upper end with said bearing member, and a pitman having adjustably connected sections for longitudinal adjustments pivotally connected at opposite ends with said crank portion and with said propeller arm above the foot of the latter.

In testimony whereof I affix my signature.

AMOS F. LADWIG.